(12) United States Patent
Srinivasa et al.

(10) Patent No.: US 8,971,167 B1
(45) Date of Patent: Mar. 3, 2015

(54) DATA ENCODING METHODS IN A COMMUNICATION SYSTEM

(75) Inventors: Sudhir Srinivasa, Sunnyvale, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 187 days.

(21) Appl. No.: 13/439,623

(22) Filed: Apr. 4, 2012

Related U.S. Application Data

(60) Provisional application No. 61/472,586, filed on Apr. 6, 2011, provisional application No. 61/509,956, filed on Jul. 20, 2011.

(51) Int. Cl.
*H04J 11/00* (2006.01)
*H04L 27/26* (2006.01)

(52) U.S. Cl.
CPC .................... *H04L 27/2608* (2013.01)
USPC .......................................... 370/208

(58) Field of Classification Search
None
See application file for complete search history.

(56) References Cited

U.S. PATENT DOCUMENTS

| 8,724,720 | B2 | 5/2014 | Srinivasa et al. | |
|---|---|---|---|---|
| 2007/0204052 | A1* | 8/2007 | Trainin et al. | 709/230 |
| 2008/0002649 | A1* | 1/2008 | Xia et al. | 370/338 |
| 2008/0204286 | A1* | 8/2008 | Kose | 341/67 |
| 2010/0322334 | A1* | 12/2010 | Wang et al. | 375/267 |
| 2011/0026623 | A1* | 2/2011 | Srinivasa et al. | 375/260 |
| 2011/0249660 | A1* | 10/2011 | Noh et al. | 370/338 |
| 2014/0126659 | A1 | 5/2014 | Srinivasa et al. | |

OTHER PUBLICATIONS

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

(Continued)

*Primary Examiner* — Otis L Thompson, Jr.

(57) ABSTRACT

A physical layer (PHY) data unit is generated for transmission via a communication channel in accordance with a transmission configuration. The transmission configuration corresponds to at least one of (i) one or more particular numbers of spatial streams, and (ii) one or more particular channel bandwidths. A number of orthogonal frequency division multiplexing (OFDM) symbols to be included in a payload of the PHY data unit is determined based on (i) determining the number of OFDM symbols according to a first technique when using a modulation and coding scheme (MCS) from a set of MCSs allowed for the transmission configuration, and (ii) determining the number of OFDM symbols according to a second technique when using an MCS excluded from the set of MCSs allowed for the transmission configuration.

31 Claims, 5 Drawing Sheets

(56) References Cited

OTHER PUBLICATIONS

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

IEEE Std 802.11 b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

\* cited by examiner

| MCS | Modulation | Coding Rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |

DATA ENCODING METHODS IN A COMMUNICATION SYSTEM

CROSS-REFERENCES TO RELATED APPLICATIONS

This disclosure claims the benefit of U.S. Provisional Patent Application No. 61/472,586, filed on Apr. 6, 2011, and U.S. Provisional Patent Application No. 61/509,956, filed on Jul. 20, 2011, the disclosures of both of which are hereby incorporated by reference herein in their entireties.

FIELD OF THE DISCLOSURE

The present disclosure relates generally to communication networks and, more particularly, to generating physical layer data units according to various modulation and coding schemes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of wireless local area network (WLAN) standards such as the Institute for Electrical and Electronics Engineers (IEEE) 802.11a, 802.11b, 802.11g, and 802.11n Standards, has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In one embodiment, a method for generating physical layer (PHY) data units for transmission via a communication channel includes generating a plurality of first PHY data units that conform to a communication protocol and that are to be transmitted in accordance with a transmission configuration. The transmission configuration corresponds to at least one of (i) one or more particular numbers of spatial streams, and (ii) one or more particular channel bandwidths. The communication protocol specifies (i) a set of allowed modulation and coding schemes (MCSs) for the transmission system configuration, and (ii) a first technique for determining, for each first PHY data unit, a number of orthogonal frequency division multiplexing (OFDM) symbols to be included in a payload of the first PHY data unit. The method also includes generating a second PHY data unit for transmission according to the transmission configuration, including determining, according to a second technique, a number of OFDM symbols to be included in a payload of the second PHY data unit. The second PHY data unit is to be transmitted using an MCS excluded from the set of allowed MCSs. The method further includes generating the determined number of OFDM symbols to be included in the payload of the second PHY data unit.

In another embodiment, an apparatus for generating physical layer (PHY) data units for transmission via a communication channel comprises a network interface configured to generate a plurality of first PHY data units that conform to a communication protocol and that are to be transmitted in accordance with a transmission configuration. The transmission configuration corresponds to at least one of (i) one or more particular numbers of spatial streams, and (ii) one or more particular channel bandwidths. The communication protocol specifies (i) a set of allowed modulation and coding schemes (MCSs) for the transmission configuration, and (ii) a first technique for determining, for each first PHY data unit, a number of orthogonal frequency division multiplexing (OFDM) symbols to be included in a payload of the first PHY data unit. The network interface is also configured to generate a second PHY data unit for transmission according to the transmission configuration. The network interface is configured to, when generating the second PHY data unit, determine, according to a second technique, a number of OFDM symbols to be included in a payload of the second PHY data unit, wherein the second PHY data unit is to be transmitted using an MCS excluded from the set of allowed MCSs, and generate the determined number of OFDM symbols to be included in the payload of the second PHY data unit.

In yet another embodiment, a method is for generating a PHY data unit for transmission in a communication channel. The PHY data unit is to be transmitted in accordance with a transmission configuration, wherein the transmission configuration corresponds to at least one of (i) one or more particular numbers of spatial streams and (ii) one or more particular channel bandwidths. The method includes determining a number of orthogonal frequency division multiplexing (OFDM) symbols to be included in a payload of the PHY data unit, including (i) determining the number of OFDM symbols according to a first technique when using a modulation and coding scheme (MCS) from a set of MCSs allowed for the transmission configuration and (ii) determining the number of OFDM symbols according to a second technique when using an MCS excluded from the set of MCSs allowed for the transmission configuration. The method also includes generating the PHY data unit to include the determined number of OFDM symbols.

In still another embodiment, an apparatus is for generating a PHY data unit for transmission in a communication channel, wherein the PHY data unit is to be transmitted in accordance with a transmission configuration, wherein the transmission configuration corresponds to at least one of (i) one or more particular numbers of spatial streams and (ii) one or more particular channel bandwidths. The apparatus comprises a network interface configured to determine a number of orthogonal frequency division multiplexing (OFDM) symbols to be included in a payload of the PHY data unit, including (i) determining the number of OFDM symbols according to a first technique when using a modulation and coding scheme (MCS) from a set of MCSs allowed for the transmission configuration and (ii) determining the number of OFDM symbols according to a second technique when using an MCS excluded from the set of MCSs allowed for the transmission configuration. The network interface is also configured to generate the PHY data unit to include the determined number of OFDM symbols.

DETAILED DESCRIPTION

In embodiments described below, a wireless network device such as an access point (AP) of a wireless local area network (WLAN) transmits data streams to one or more client stations. The AP is configured to operate according to a certain communication protocol ("the communication protocol", e.g., the IEEE-801.11ac Standard, now being developed). In an embodiment, the communication protocol specifies a set of allowable modulation and coding schemes (MCSs) that the AP (and client stations) can utilize for data transmission. Further, according to an embodiment, the communication protocol excludes certain MCSs from the set of allowable MCS for use with certain transmission configurations, for example, with certain channel bandwidths or with certain channel bandwidths/number of spatial streams combinations. Such excluded MCSs may lead to a large number of padding bits and, thus, unacceptably long packets in some situations. Accordingly, an encoding flow defined by the communication protocol generally does not accommodate the excluded MCSs. In some situations, however, it is beneficial to use excluded MCSs for at least some transmission configurations, for example in order to utilize desirable data rates associated with these transmission configurations. Accordingly, in embodiments described in more detail below, in order to accommodate at least some of the excluded MCSs for at least some transmission configurations, one or more of altered encoding techniques (i.e., different than specified in the communication protocol) described herein are used at least in situations in which an excluded MCS is being utilized for data transmission. In some embodiments, an altered encoding technique is also used when utilizing allowable MCSs.

In some embodiments, a transmitter/receiver pair utilizes multiple transmission configurations during communications. For example, data units transmitted from the transmitter to the receiver at different times may be transmitted according to different transmission configurations, in an embodiment. For instance, different data units may be transmitted from the transmitter to the receiver with different MCSs, numbers of streams, and/or channel bandwidths, in an embodiment.

Figure 1:
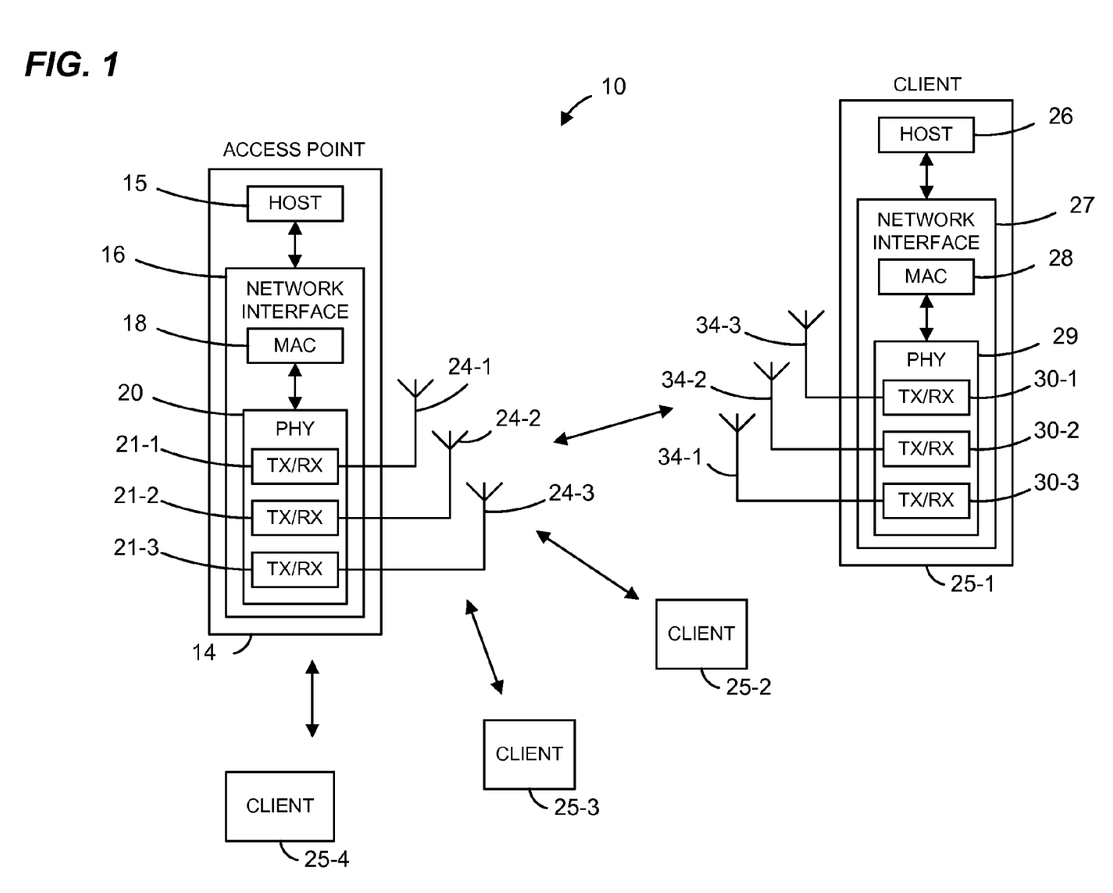
FIG. 1 is a block diagram of an example wireless communication network in which parsing and encoding techniques described herein are utilized, according to an embodiment.

FIG. 1 is a block diagram of an example wireless local area network (WLAN) 10, according to an embodiment, including an AP 14 configured to operate at least according to the communication protocol. The AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In an embodiment, the MAC processing unit 18 and the PHY processing unit 20 are configured to operate according to a communication protocol. In another embodiment, the MAC unit processing 18 and the PHY processing unit 20 are also configured to operate according to at least one other communication protocol (e.g., the IEEE 802.11n Standard, the IEEE 802.11g Standard, the IEEE 802.11a Standard, etc.).

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments. In an embodiment, the MAC processing unit 28 and the PHY processing unit 29 are configured to operate according to the communication protocol. In another embodiment, the MAC unit processing 28 and the PHY processing unit 29 are also configured to operate according to at least one other communication protocol (e.g., the IEEE 802.11n Standard, the IEEE 802.11g Standard, the IEEE 802.11a Standard, etc.).

In an embodiment, one or all of the client stations 25-2, 25-3 and 25-4 has a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the communication protocol. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the communication protocol, according to an embodiment.

In various embodiments, the PHY processing unit 29 of the client device 25-1 is configured to generate data units conforming to the communication protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the communication protocol, according to an embodiment.

Figure 2:
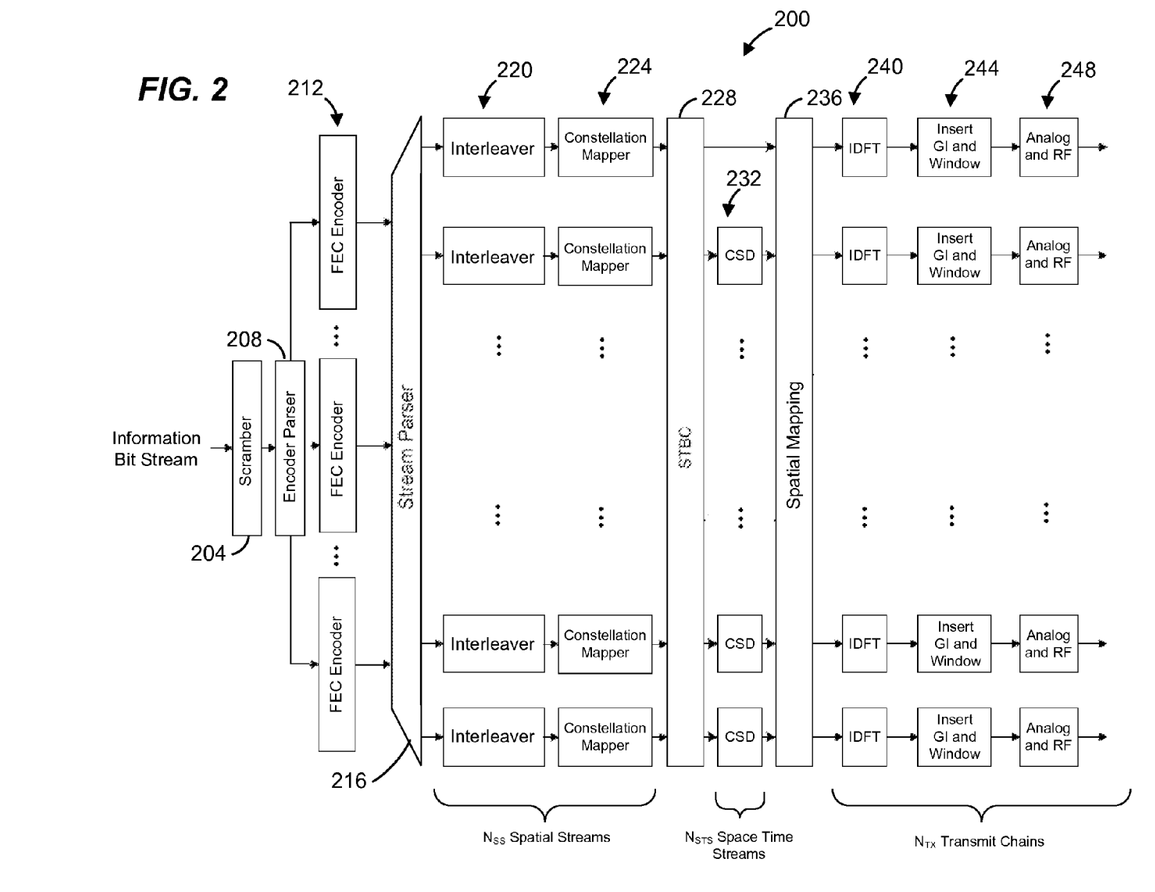
FIG. 2 is a block diagram of an example physical layer (PHY) processing unit, according to an embodiment.

FIG. 2 is a block diagram of a transmit portion of an example PHY processing unit 200 configured to operate according to the communication protocol, according to an embodiment. Referring to FIG. 1, the AP 14 and the client station 25-1, in one embodiment, each include a PHY processing unit such as the PHY processing unit 200.

The PHY unit 200 includes a scrambler 204 that generally scrambles an information bit stream to reduce an occurrence of long sequences of ones or zeros, according to an embodiment. In another embodiment, the scrambler 204 is replaced with a plurality of parallel scramblers located after an encoder parser 208. In this embodiment, each of the parallel scramblers has a respective output coupled to a respective one of a plurality of forward error correction (FEC) encoders 212. The plurality of parallel scramblers operates simultaneously on a demultiplexed stream. In yet another embodiment, the scrambler 204 comprises a plurality of parallel scramblers and a demultiplexer that demultiplexes the information bit stream to the plurality of parallel scramblers, which operate simultaneously on demultiplexed streams. These embodiments may be useful, in some scenarios, to accommodate wider bandwidths and thus higher operating clock frequencies.

The encoder parser 208 is coupled to the scrambler 204. The encoder parser 208 demultiplexes the information bit stream into one or more encoder input streams corresponding to one or more FEC encoders 212. In another embodiment with a plurality of parallel scramblers, the encoder parser 208 demultiplexes the information bit stream into a plurality of streams corresponding to the plurality of parallel scramblers.

Different numbers of FEC encoders 212 operate in parallel in various embodiments and/or scenarios. For example, according to one embodiment, the PHY processing unit 200 includes four FEC encoders 212, and one, two, three, or four encoders operate simultaneously depending on the particular MCS, bandwidth, and the number of spatial streams. In another embodiment, the PHY processing unit 200 includes five FEC encoders 212, and one, two, three, four, or five encoders operate simultaneously. In another embodiment, the PHY unit 200 includes up to ten FEC encoders 212, and one, two, three, four, five, six, seven, eight, nine or ten encoders operate simultaneously depending on the particular MCS, bandwidth, and guard interval being utilized Each FEC encoder 212 encodes the corresponding input stream to generate a corresponding encoded stream. In one embodiment, each FEC encoder 212 includes a binary convolutional encoder. In another embodiment, each FEC 212 encoder includes a binary convolutional encoder followed by a puncturing block. In another embodiment, each FEC encoder 212 includes a low density parity check (LDPC) encoder. In yet another embodiment, each FEC encoder 212 additionally includes a binary convolutional encoder followed by a puncturing block. In this embodiment, each FEC encoder 212 is configured to implement one or more of 1) binary convolutional encoding without puncturing; 2) binary convolutional encoding with puncturing; or 3) LDPC encoding.

The number of encoders used for a particular transmission configuration, in an embodiment, is determined by the data rate corresponding to a short guard interval (SGI) defined by the communication protocol. As an example, according to one embodiment, the number of encoders operating simultaneously increments at multiples of the data rate, e.g., every 600 Mbps. In other words, one encoder is utilized for data rates up to 600 Mbps, two encoders are utilized for data rates between 600 Mbps and 1200 Mbps, as an example. In some embodiments, the number of encoders 212 used in parallel also depends on the type of encoding used for the data unit being generated. For example, in an embodiment, one encoder 212 is utilized for all transmission configurations when LDPC encoding is being utilized, and more than one encoder 212 is utilized for some transmission configurations when BCC encoding is used.

In any event, a stream parser 216 parses the one or more encoded streams into one or more spatial streams for separate interleaving and mapping into constellation points. Corresponding to each spatial stream, an interleaver 220 interleaves bits of the spatial stream (i.e., changes the order of the bits) to prevent long sequences of adjacent noisy bits from entering a decoder at the receiver. Also corresponding to each spatial stream, a constellation mapper 224 maps an interleaved sequence of bits to constellation points corresponding to different subcarriers of an orthogonal frequency division multiplexing (OFDM) symbol. More specifically, for each spatial stream, the constellation mapper 224 translates every bit sequence of length $\log_2(C)$ into one of C constellation points, in an embodiment. The constellation mapper 224 handles different numbers of constellation points depending on the MCS being utilized. In an embodiment, the constellation mapper 224 is a quadrature amplitude modulation (QAM) mapper that handles C=2, 4, 16, 64, 256, and 1024. In other embodiments, the constellation mapper 224 handles different modulation schemes corresponding to C equaling different subsets of at least two values from the set {2, 4, 16, 64, 256, 1024}.

In an embodiment, a space-time block coding unit 228 receives the constellation points corresponding to the one or more spatial streams and spreads the spatial streams to a greater number of space-time streams. In some embodiments, the space-time block coding unit 228 is omitted. A plurality of cyclic shift diversity (CSD) units 232 are coupled to the space-time block unit 228. The CSD units 232 insert cyclic shifts into all but one of the space-time streams (if more than one space-time stream) to prevent unintentional beamforming. For ease of explanation, the inputs to the CSD units 232 are referred to as space-time streams even in embodiments in which the space-time block coding unit 228 is omitted.

A spatial mapping unit 236 maps the space-time streams to transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

Each output of the spatial mapping unit 236 corresponds to a transmit chain, and each output of the spatial mapping unit 236 is operated on by an inverse discrete Fourier transform (IDFT) calculation unit 240, e.g., an inverse fast Fourier transform calculation unit, that converts a block of constellation points to a time-domain signal. Outputs of the IDFT units 240 are provided to GI insertion and windowing units 244 that prepend, to each OFDM symbol, a guard interval (GI) portion, which is a circular extension of the OFDM symbol in an embodiment, and smooth the edges of each symbol to increase spectral delay. Outputs of the GI insertion and windowing units 244 are provided to analog and RF units 248 that convert the signals to analog signals and upconvert the signals to RF frequencies for transmission. The signals are transmitted in a 20 MHz, a 40 MHz, an 80 MHz, a 120 MHz, or a 160 MHz bandwidth channel, in various embodiments and/or scenarios. In other embodiments, other suitable channel bandwidths are utilized.

Figure 3:
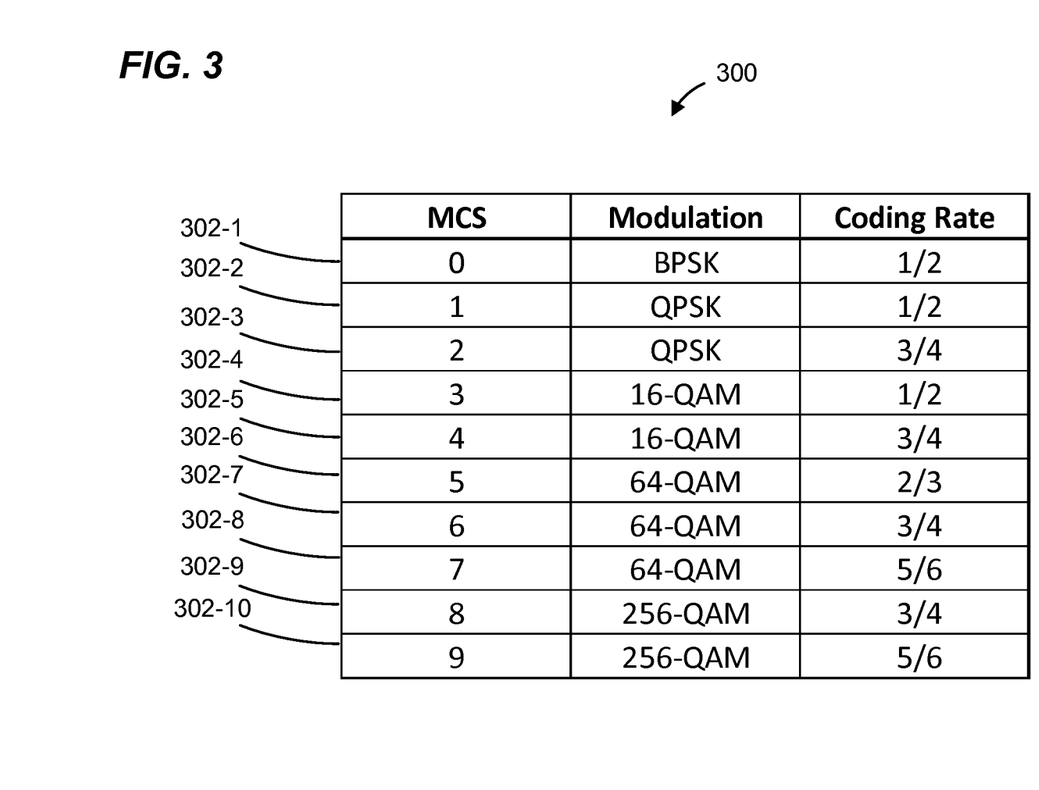
FIG. 3 is an example modulation and coding scheme (MCS) table, according to an embodiment.

In an embodiment, the communication protocol provides a set of allowable modulation and coding schemes (MCSs), and an AP (e.g., AP14, FIG. 1) selects (and/or in some way negotiates) a particular MCS from the set of allowable MCSs to be used for communication with a client station. An example MCS table 300 corresponding to an allowable MCS set according to one embodiment is provided in FIG. 3. The MCS table 300 includes ten allowable MCSs 302-1 through 302-10 indexed, respectively, MCS 0 through MCS 9. As can be seen in FIG. 3, each MCS index corresponds to a particular modulation type/coding rate combination. As will be discussed in more detail below, in some embodiments, certain allowable MCSs are excluded from the set of the allowable MCSs for use with certain transmission configurations, for example, with certain channel bandwidths, or with certain channel bandwidth/number of spatial streams combinations. Accordingly, in such embodiments, the set of allowable MCSs includes some MCSs that are allowed for use only with certain transmission configurations, and are not allowed (or excluded) for use with other transmission configurations. In other words, in such embodiments, an "allowable" MCS is not necessarily "allowed" for a particular transmission configuration, but may be "allowed" for other transmission configurations.

According to an embodiment, an MCS selected from the MCS table 300, in combination with other specifics of the transmission configuration, such as, for example, the bandwidth of the communication channel being utilized, the number of tones in an OFDM symbol used for transmitting data ("data tones"), the number of spatial streams, the guard interval length, etc., generally determines the data rate of transmission, according to an embodiment. Various example transmission channels and tone mappings that are utilized in some embodiments of the present disclosure are described in U.S. patent application Ser. No. 12/846,681, entitled "Methods and Apparatus for WLAN Transmission", filed on Jul. 29, 2010, which is hereby incorporated by reference herein in its entirety. In an embodiment, if BCC encoding is being utilized, the data rate, in turn, determines the number of encoders that are needed to operate in parallel ("operating encoders") to generate the data unit. LDPC encoding, on the other hand, does not necessarily require operation of multiple encoders, and only one encoder is utilized to encode a data unit regardless of the data rate, according to an embodiment. In another embodiment, more than one LDPC encoder is used for some data rates, but the number of operating encoders is different from the number of operating BCC encoders that would be utilized for the same data rate.

As discussed above, in some embodiments, the communication protocol excludes certain MCSs from consideration for certain transmission configurations (e.g., for certain number of spatial streams/channel bandwidth combinations), if such MCS/transmission configuration combinations result in violation of certain encoding and/or parsing constraints defined by the communication protocol, or excludes an MCS from consideration for all transmission configurations, for example for all numbers of spatial streams for a particular communication channel bandwidth, if the MCS does not satisfy the encoding and/or parsing constraints for at least one transmission configuration, for example, for at least one spatial stream. In some embodiments, the communication protocol specifies one or more conditions that need to be met for a transmission configuration in order for an MCS from the set of allowable MCSs to be allowed for use in this transmission configuration. In another embodiment, the communication protocol, in addition to specifying the set of allowable MCSs, specifies a set of excluded MCSs, i.e., a set of MCSs that are excluded for consideration for certain transmission configurations, or that are excluded from the set of allowable MCSs completely for all transmission configurations (e.g., for a certain communication channel bandwidth). In yet another embodiment, the communication protocol specifies a set of allowed MCSs in conjunction with specifying for which transmission configurations each MCS is allowed to be used. In this case, the communication protocol need not explicitly specify exclusion conditions nor explicitly provide a set of excluded MCSs.

As an example, according to an embodiment, an MCS is excluded from use in a certain transmission configuration if the number of information (or data) bits in each OFDM symbol corresponding to the MCS/transmission configuration combination would not be an integer. In general, in various embodiments and/or scenarios, excluding such MCSs guarantees that a packet of any suitable length can be encoded in accordance with the encoding flow provided by the communication protocol without a large number of padding bits and, accordingly, without a large number of dummy symbols. In other words, in some embodiments, if the excluded MCSs are used, for at least some packet lengths, the encoding and/or parsing techniques defined by the communication protocol will lead to an unacceptably large amount of padding.

As an example, in one embodiment, the communication protocol excludes MCS 9 (302-10 of FIG. 3), i.e., modulation type 256-QAM and coding rate of 5/6, for a 20 MHz-wide channel (generated with 52 data tones) for transmission over 1, 2, 4, 5, 7, and/or 8 spatial streams, because in such situations MCS 9 would result in a non-integer number of data bits per OFDM symbol. For example, in a transmission configuration with one spatial stream, 256-QAM modulation (i.e., 8 bits per subcarrier) results in the number of coded bits per symbol ($N_{CBPS}$) given by $N_{CBPS}$=52×8=416. With the coding rate of 5/6, the number of data bits per symbol is ($N_{DBPS}$) is given by $N_{DBPS}$=416×6=3463. Similarly, $N_{DBPS}$ is not an integer in cases of transmission in a 20 MHz-wide communication channel using 2, 4, 5, 7, and 8 spatial streams, according to some embodiments. Accordingly, in some such embodiments, MCS 9 is excluded by the communication protocol for a 20 MHz-wide communication channel for most suitable transmission configurations (i.e., for 1, 2, 4, 5, 7, and 8 spatial streams), or, alternatively is excluded by the communication protocol for a 20 MHz-wide channel for all transmission configurations (e.g., for any number of spatial streams). As can be seen from FIG. 3, MCS 9 corresponds to the highest modulation order/coding rate combination specified by the communication protocol and, consequently, corresponds to the highest achievable data rate for a 20 MHz-wide communication channel, i.e., the data rate that could be achieved if MCS 9 was allowed for some or all of the excluded transmission configurations. Accordingly, it may be beneficial to use excluded MCSs in some situations, for example when the higher data rate associated with the MCS is needed or desired. However, such benefits may be outweighed if using such MCSs results in large numbers of padding bits being added.

According to an embodiment, the communication protocol provides a common set of allowable MCSs (e.g., a common MCS table) regardless of the encoding type (e.g., BCC or LDPC) being utilized and also commonly excludes MCSs regardless of the encoding type being utilized. Accordingly, in this embodiment, if an MCS is excluded for BCC encoding, this MCS is also excluded for scenarios when LDPC encoding is used. Such a common MCS table and common MCS exclusion rules may lead to unnecessary exclusion of certain MCSs for scenarios when LDPC encoding is used because in some scenarios LDPC encoding can accommodate such MCSs for at least some transmission configurations without significant changes to the encoding flow defined by the communication protocol and without a large number of padding bits (or dummy symbols). Accordingly, in some embodiments, to allow use of excluded MCSs at least in situations in which LDPC encoding is being used, one or more encoding techniques described below is used (e.g., in a proprietary mode) to generate data units at least for excluded transmission configurations (i.e., when using an excluded MCS). In some such embodiments, the particular excluded MCS used to generate a data unit, along with other various attributes of the data unit, such as the channel bandwidth that the data unit occupies, the coding type used to generate the data unit, etc., is communicated to a receiver using a preamble of the data unit (e.g., in a signal field of the preamble of the data unit).

As mentioned above, in various embodiments, the communication protocol specifies certain encoding techniques or certain "encoding flows" that allow transmission and subsequent reception and decoding of data units conforming to the communication protocol. In general, an encoding flow defined by the communication protocol specifies techniques for calculating various parameters associated with the encoding process, according to an embodiment. In one embodiment, for example, an encoding flow for a low density parity check (LDPC) encoding includes steps of (i) calculating the number of OFDM symbols ($N_{sym}$) to include the information bits for a payload of a physical layer (PHY) data unit, (ii) selecting a codeword from a number of suitable codewords provided by the communication protocol based on certain selection rules, (iii) determining a number of shortening bits to be added to the information bits prior to encoding, and (iv) determining a number of puncturing and/or repetition bits to be applied to the encoded data stream after encoding. In particular, in one embodiment, according to the communication protocol, the number of OFDM symbols to include the information bits of the payload is determined according to:

$$N_{sym} = m_{STBC} * \left\lceil \frac{8L+16}{m_{STBC}N_{DBPS}} \right\rceil \qquad \text{Equation 1}$$

where L is a number of octets in the plurality of information bits, $m_{STBC}$ is a parameter where, if space-time block coding is utilized and $m_{STBC}=1$, and if space-time block coding is not utilized, $m_{STBC}=2$, $N_{DBPS}$ is a number of data bits per symbol, and $\lceil \ \rceil$ represents the integer ceiling function.

In order to allow at least some excluded MCSs to be utilized (e.g., in a proprietary mode), according to one embodiment, an estimate of the number of symbols ($N_{sym,init}$) is calculated, at least in situations in which an excluded MCS is being utilized, according to:

$$N_{sym,init} = i*m_{STBC} * \left\lceil \frac{8L+16}{i*m_{STBC}N_{DBPS}} \right\rceil \qquad \text{Equation 2}$$

where i is an integer selected such that $i*m_{STBC}N_{DBPS}$ is an integer even when $N_{DBPS}$ is not an integer. In general, Equation 2 ensures that the number of OFDM symbols is an integer multiple of $i*m_{STBC}$, and accordingly, ensures that the number of data bits per i OFDM symbols is an integer, in an embodiment. In one embodiment, the estimate of the number of OFDM symbols $N_{sym,init}$ is calculated according to Equation 2 when MCS 9 is used for a 20 MHz-wide communication channel utilizing 1, 2, 4, 5, 7, or 8 spatial streams, for example. As an illustrative example, in one such embodiment, in which a 20 MHz-wide communication channel is generated using 52 data tones, i=3 ensures that an integer number of data bits are transmitted in every three OFDM symbols.

In some embodiments and/or scenarios, such as when using LDPC encoding, using the number of symbols $N_{sym,init}$ leads to puncturing a relatively large number of parity bits. In some embodiments, a revised number of symbols $N_{sym}$ is determined based on $N_{sym,init}$ and one or more of a codeword length, a number of codewords, and an encoding technique. For example, in some embodiments, $N_{sym}$ is determined to be one or more symbols larger than $N_{sym,init}$ (e.g., one, two, or some other suitable number of symbols) so that the number of bits that are punctured is reduced to a suitable level. In other embodiments, the estimate of the number of symbols $N_{sym,init}$ is used as the number of symbols $N_{sym}$.

In some embodiments and/or scenarios, Equation 2 leads to a large number of padding bits, and accordingly, a large number of dummy OFDM symbols, during transmission of small packets (i.e., with a low number of information bits in a data portion (e.g., payload) of a PHY data unit). Accordingly, in some embodiments, a large number of dummy symbols are avoided by transmitting PHY data units of at least a suitably large length. In such embodiments, for example when the excluded MCS being utilized is MCS 9 302-10 of FIG. 3, the signal to noise ratio (SNR) associated with the communication channel, at least for 20 MHz-wide communication channels, is generally suitably high to support transmission of data packets of at least a certain suitable length.

In an embodiment in which the number of OFDM symbols is calculated based on using Equation 2, the remainder of the encoding process (e.g., shortening, puncturing and/or repetition bit calculations) follows the encoding flow defined by the communication protocol. In this case, a receiver receiving the data unit can accurately decode the data using the encoding (and, accordingly, decoding) flow defined by the communication protocol, i.e., no changes are required to be made in the decoding flow as a result of the altered $N_{sym}$ calculation given in Equation 1.

In one embodiment, Equation 2 is utilized to calculate the number of symbols for an excluded MCS (e.g., an excluded MCS 9 for a 20 MHz-wide communication channel), and a different equation (e.g., Equation 1) is utilized for non-excluded (i.e., allowed) MCSs. In another embodiment, Equation 2 is used to calculate $N_{sym}$ for excluded MCSs as well as for allowed MCSs. That is, in an embodiment, common encoding flow for all MCSs (excluded and allowed) and all transmission configurations is utilized.

Alternatively, in another embodiment, in order to allow at least some excluded MCSs to be utilized (e.g., in a proprietary mode) the number of symbols ($N_{sym}$) is calculated, at least in situations in which an excluded MCS is being utilized, according to according to:

$$N_{sym,init} = m_{STBC} \times \left\lceil \frac{8L+16}{m_{STBC}\lfloor N_{DBPS} \rfloor} \right\rceil \qquad \text{Equation 3}$$

where $\lfloor \ \rfloor$ represents the integer floor function. As can be seen from a comparison of Equations 2 and 3, in this embodiment, the estimate of the number of OFDM symbols is calculated using a "virtual" number of data bits per symbol ($N_{DBPS}^{virtual}$), where $N_{DBPS}^{virtual}$ is selected to be the smallest integer less than or equal to the "true" $N_{DBPS}$ (i.e. $N_{DBPS}^{virtual}=\text{floor}(N_{DBPS})=\lfloor N_{DBPS} \rfloor$). Accordingly, in an embodiment, the number of bits in the payload, $N_{pld}$, is also calculated using floor($N_{DBPS}$), according to:

$$N_{pld}=N_{sym,init}\times\lfloor N_{DBPS} \rfloor \qquad \text{Equation 4}$$

In some embodiments in which $N_{sym,init}$ is calculated using a virtual number of data bits per symbol corresponding to floor($N_{DBPS}$), instead of inserting post-encoding padding bits, a number of available bits within a minimum number of OFDM symbols required for a data field of the data unit is determined according to:

$$N_{avbits}=N_{CBPS}\times N_{sym,init} \qquad \text{Equation 5}$$

where $N_{CBPS}$ is a number of coded bits per symbol, and the number of shortening, puncturing and/or repetition bits is determined based on $N_{avbits}$. In an embodiment, when utilizing excluded MCSs, the number of bits in the payload, $N_{pld}$, is calculated according to Equation 4 and the number of available bits, $N_{avbits}$, is calculated according to Equation 5. In this embodiment, the rest of the LDPC encoding procedure, when utilizing excluded MCSs, is the same as or similar to the LDPC encoding procedure when utilizing allowed MCSs. On the other hand, when using allowed MCSs in this embodiment, the number of bits in the payload, $N_{pld}$ and the number of available bits, $N_{avbits}$, are calculated according to suitable equations different than Equation 4 and Equation 5.

In some embodiments, a revised number of symbols $N_{sym}$ is determined based on $N_{sym,init}$ as discussed above. In other embodiments, the estimate of the number of symbols $N_{sym,init}$ is used as the number of symbols $N_{sym}$.

Further, in some embodiments in which a virtual number of data bits per OFDM symbol ($N_{DBPS}^{virtual}$) is utilized, padding bits are inserted into an encoded data stream ("post-encoding" padding bits) such that the number of data plus padding bits is equal to the "true" number of data bits per OFDM symbol. In one such embodiment, the number of such "post-encoding" padding bits is calculated according to:

$$p = N_{sym} \times N_{CBPS} - N_{pld}/R \qquad \text{Equation 6}$$

where R is a coding rate of the MCS being utilized. In such embodiments, a receiver (e.g., client station 25-1, FIG. 1) receiving a data unit encoded in accordance with Equations 3-4 and 6 is able to calculate the number of bits in the payload $N_{pld}$ and the number of post-encoding bits p based on the number of OFDM symbols included in the data unit—an indication of which is included in a preamble of the data unit, for example—and is therefore able to remove the inserted post-encoding padding bits and properly decode the data. In such embodiments, when the number of symbols is determined according to Equation 3, the number of payload bits is determined according to Equation 4, and the number of post encoding padding bits is determined according to Equation 6, and no further changes to the encoding/decoding flow specified by the communication protocol are required to be made (i.e., the remainder of the encoding/decoding flow is as specified by the communication protocol) for using at least some excluded MCSs.

In some embodiments relating to the use of any of Equations 3-6, a revised number of symbols $N_{sym}$ is determined based on $N_{sym,init}$ as discussed above. In other embodiments, the estimate of the number of symbols $N_{sym,init}$ is used as the number of symbols $N_{sym}$.

Similar to the embodiment discussed above with regard to Equation 2, in some embodiments in which $N_{sym,init}$ is calculated using a virtual number of data bits per OFDM symbol, the remainder of the encoding and decoding flow is as defined by the communication protocol. Thus, in this embodiment, only minor changes need to be made to the encoding flow to accommodate at least some excluded MCSs in the case of LDPC encoding. Also similar to the embodiment discussed above with regard to Equation 2, in one embodiment, encoding flow in accordance with Equations 3-4 and 6 is used for some or all of the excluded MCSs (e.g., MCS 9), and a different encoding flow (e.g., the encoding flow defined by the communication protocol) is utilized for non-excluded (i.e., allowed) MCSs. In another embodiment, the altered encoding flow is used for excluded MCSs as well as for allowed (i.e., not excluded) MCSs. That is, in this embodiment, common encoding flow for all MCSs and all transmission configurations is utilized.

Alternatively, in yet another embodiment, in order to allow at least some excluded MCSs to be utilized (e.g., in a proprietary mode) the number of symbols ($N_{sym}$) is calculated, at least in situations in which an excluded MCS is being utilized, using a virtual number of coded bits per symbol ($N_{CBPS}^{virtual}$), where $N_{CBPS}^{virtual}$ is lower than the "true" $N_{CBPS}$. That is, in this embodiment, a lower number of data tones, rather than all available data tones, are used for data transmission. The remaining data tones—that are not used for data transmission—are populated with padding bits inserted into an encoded data stream (i.e., "post-encoding" padding bits). In one embodiment, the additional padding bits in each OFDM symbol are then discarded at the receiver to allow the receiver to properly decode the data. In another embodiment, the additional padding bits are utilized by the receiver is a different manner (for example, as added data bit redundancy).

In such embodiments, the virtual number of coded data bits per symbol ($N_{CBPS}^{virtual}$) is selected such that the corresponding number of data bits per symbol is an integer. Further, in some such embodiments, the virtual number of coded bits per symbol ($N_{CBPS}^{virtual}$) is selected such that excluded MCSs are accommodated when LDPC encoding is being utilized as well as when BCC encoding is being utilized. That is, in such embodiments, the virtual number of coded bits per symbol ($N_{CBPS}^{virtual}$) allows all excluded MCSs to be utilized for both BCC and LDPC encoding. For example, in one such embodiment, the virtual number of data bits is determined according to:

$$N_{CBPS}^{virtual} = \left( \left\lfloor \frac{N_{CBPS}}{N_R N_{ES}} \right\rfloor N_R N_{ES} \right) \qquad \text{Equation 7}$$

where $N_R$ is determined by the coding rate $R = N_R/D_R$, $N_{ES}$ is the number of operating encoders. The number of additional padding bits to be added after encoding to reach the true number of data bits is then determined based on the calculated number of virtual coded bits and a corresponding number of true coded bits, according to an embodiment.

As an illustrative example, in an embodiment, in a case of a 20 MHz-wide communication channel with a true $N_{CBPS}$ equal to 52, a virtual number $N_{CBPS}$ of 48 is utilized for calculating the number of OFDM symbols and a corresponding number of padding bits (i.e., $N_{CBPS}^{virtual} = 48$). Accordingly, in this embodiment, 4 additional padding bits are then added to each OFDM symbol after encoding to reach the true $N_{CBPS}$ of 52 bits in each OFDM symbol. In another embodiment, a different number of virtual $N_{CBPS}$ is used and a corresponding different number of additional padding bits are added to each OFDM symbol after encoding, including another embodiment in which a 20 MHz-wide communication channel is used.

In some embodiments in which $N_{sym,init}$ is calculated using a virtual number of coded bits per symbol, the remainder of the encoding flow is as defined by the communication protocol. Thus, in such embodiments, only minor changes need to be made to the encoding flow to accommodate at least some excluded MCSs for LDPC and/or for BCC encoding. Further, similar to the embodiments discussed, in an embodiment, $N_{sym,init}$ is calculated using a virtual number of coded bits per symbol only for some or all of the excluded MCSs (e.g., MCS 9), and is calculated using the true number of coded bits per symbol for allowed MCSs. In another embodiment, $N_{sym,init}$ is calculated using a virtual number of coded bits per symbol for excluded MCSs as well as for allowed MCSs. That is, in this embodiment, common encoding flow for all MCSs and all transmission configurations is utilized.

Figure 4:
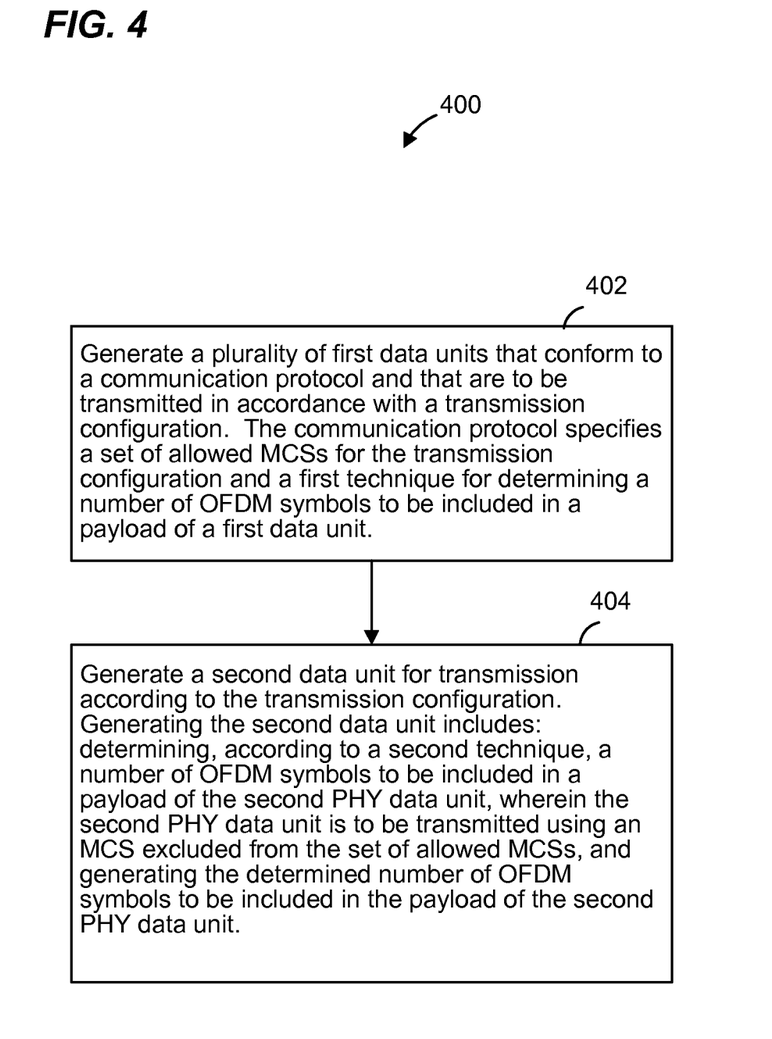
FIG. 4 is a flow diagram of an example method for generating PHY data units, according to an embodiment.

FIG. 4 is a flow diagram of an example method 400 for generating PHY data units, according to an embodiment.

With reference to FIG. 1, the method 400 is implemented by the network interface 16, in an embodiment. For example, in one such embodiment, the PHY processing unit 20 is configured to implement the method 400. According to another embodiment, the MAC processing 18 is also configured to implement at least a part of the method 400. With continued reference to FIG. 1, in yet another embodiment, the method 400 is implemented by the network interface 27 (e.g., the PHY processing unit 29 and/or the MAC processing unit 28). In other embodiments, the method 400 is implemented by other suitable network interfaces.

At block 402, at least one first PHY data unit conforming to the communication protocol is generated. Each first PHY data unit is to be transmitted in accordance with a certain transmission configuration. In an embodiment, the transmission configuration corresponds to a particular channel bandwidth and/or to a particular number of spatial streams. The communication protocol provides a set of allowed MCSs for the transmission configuration for which each of the first PHY data unit is being generated. In one embodiment, the set of allowed MCSs corresponds to the table 300 of FIG. 3. In another embodiment, the set of allowed MCSs is a suitable MCS set different from the table 300 of FIG. 3.

The communication protocol also specifies a first technique for determining a number of OFDM symbols to be included in a payload of each first PHY data unit. In one embodiment, the first technique for determining a number of OFDM symbols to be included in the payload of each first PHY data unit corresponds to calculating the number of OFDM symbols according to Equation 1. In another embodiment, the first technique for determining a number of OFDM symbols to be included in the payload of each first PHY data unit is a suitable technique that is different than calculating the number of OFDM symbols according to Equation 1.

At block 404, a second PHY data unit is generated for transmission according to the transmission configuration used for transmitting each first data unit generated at block 402. The second PHY data unit is to be transmitted using an MCS excluded from the set of allowed MCSs specified by the communication protocol for the transmission configuration. In some embodiments, an MCS is excluded from the set of allowed MCSs for a particular transmission configuration if the number of data bits per OFDM symbol for this transmission configuration would not be an integer. For example, in one such embodiment, the second PHY data unit is to be transmitted using MCS 9 (302-10, FIG. 3) for a 20 MHz-wide communication channel using 1, 2, 4, 5, 7, or 8 spatial streams. In other embodiments, the MCS used for generating the second PHY data unit at block 404 corresponds to an MCS index other than the index 9 and/or corresponds to a different channel bandwidth or different channel bandwidth/number of spatial stream combinations (depending on the transmission configuration being utilized).

In an embodiment, generating the second PHY data unit at block 404 includes using a second technique for determining a number of OFDM symbols to be included in a payload of the second PHY data unit. The second technique is different from the first technique specified by the communication protocol. In one embodiment, the number of OFDM symbols for the second data unit is determined according to Equation 2. In this embodiment, the rest of the encoding flow defined by the communication protocol is not required to be changed when the second data unit is generated at block 404. In this case, a device receiving the data unit generated at block 404 decodes the received data unit using a decoding flow consistent with the communication protocol. In another embodiment, the number of OFDM symbols for the second data unit is determined at block 404 using a virtual number of data bits per symbol (e.g., according to Equations 3, 4, 5 or according to Equations 3, 4, 6). In yet another embodiment, the number of OFDM symbols for the second data unit is determined at block 404 using a virtual number of coded bits per symbol, wherein the virtual number coded of bits per symbols is selected such that the number of data bits per symbol becomes an integer. In such embodiments, the rest of the encoding flow defined by the communication protocol (e.g., padding, shortening, puncturing, repletion, bit calculation, etc.) is slightly changed from the encoding flow defined by the communication protocol when the second data unit is generated at block 404, as described above.

According to one embodiment, the second technique is only used, at block 404, when an excluded MCS is being utilized. In another embodiment, the second technique is also used at block 402 when the at least one first data unit conforming to the communication protocol is being generated. In other words, in this embodiment, a common technique is used for allowed MCSs and for one or more excluded MCSs. In any event, data units generating using the second technique generally conform to the communication protocol, in various embodiments and/or scenarios, although they were generated using the second technique which is different than the first technique defined by the communication protocol.

Block 404 also includes generating the determined number of OFDM symbols. The generated OFDM symbols are then included in a payload of the second PHY data unit.

Figure 5:
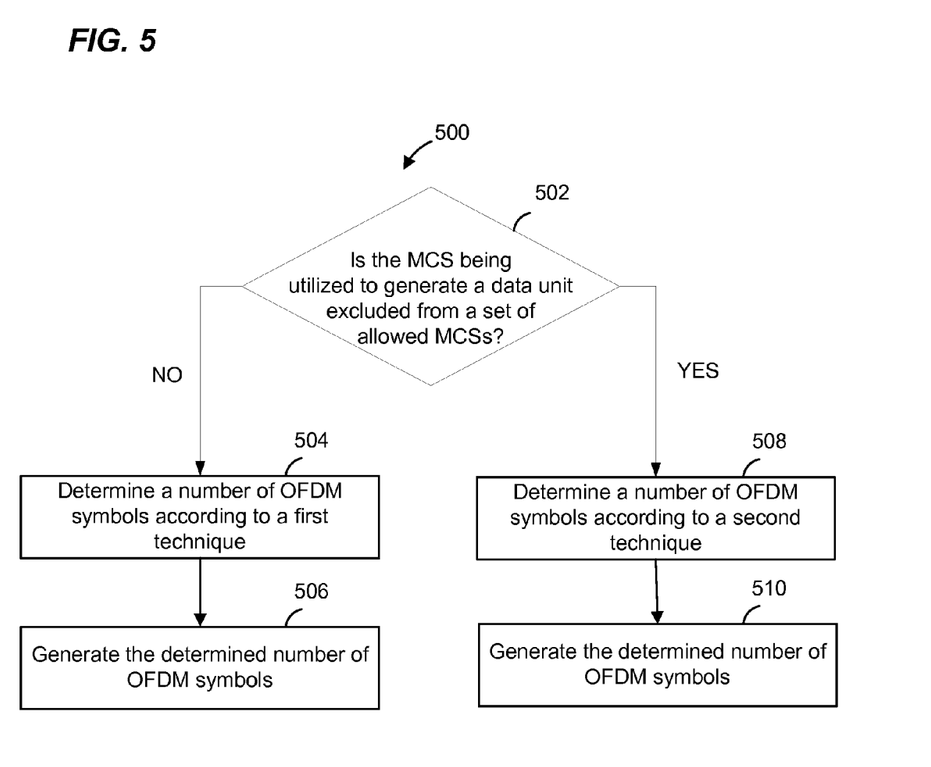
FIG. 5 is a flow diagram of an example method for generating a PHY data unit, according to an embodiment.

FIG. 5 is a flow diagram of an example method 500 for generating a PHY data unit, according to an embodiment. With reference to FIG. 1, the method 500 is implemented by the network interface 16, in an embodiment. For example, in one such embodiment, the PHY processing unit 20 is configured to implement the method 500. According to another embodiment, the MAC processing 18 is also configured to implement at least a part of the method 500. With continued reference to FIG. 1, in yet another embodiment, the method 500 is implemented by the network interface 27 (e.g., the PHY processing unit 29 and/or the MAC processing unit 28). In other embodiments, the method 500 is implemented by other suitable network interfaces.

In general, the PHY data unit being generated is to be transmitted according to a certain transmission configuration. In an embodiment, the network interface performing the method 500 is configured to operate according to the communication protocol. The communication protocol provides a set of allowed MCSs for the transmission configuration for which the PHY data unit is being generated. In one embodiment, the set of allowed MCSs corresponds to the table 300 of FIG. 3. In another embodiment, the set of allowed MCSs is a suitable set of MCSs different from the table 300 of FIG. 3.

At block 502, it is determined whether the MCS being utilized for generating the PHY data unit is excluded from the set of allowed MCSs specified by the communication protocol. In an embodiment, block 502 checks whether the MCS being utilized results in violation of one or more conditions for including an MCS for the transmission configuration. For example, in an embodiment, block 502 checks if the MCS results in a non-integer number of data bits per OFDM symbol for the transmission configuration for which the PHY data unit is being generated. In other embodiments, other suitable techniques are used at block 502 to determine whether the MCS being utilized is excluded from the set of allowed MCSs for the particular transmission configuration being utilized.

If it is determined at block 502 that the MCS is not excluded from the set of allowed MCSs (i.e., that the MCS is an allowed MCS), then a first PHY data unit is generated using an allowed MCS. In an embodiment, generating the first PHY data unit includes blocks 504 and 506.

At block 504, a number of OFDM symbols to be included in a payload of the first PHY data unit is calculated according to a first technique defined by the communication protocol. In one embodiment, the number of symbols of OFDM symbols to be included in the payload of the first PHY data unit is calculated according to Equation 1. In another embodiment, the number of OFDM symbols to be included in the payload of the first PHY data unit is determined at block 504 using a suitable technique defined by the communication protocol that is different than Equation 1.

At block 506, the number of OFDM symbols determined at block 504 is generated for inclusion in the payload of the first PHY data unit.

On the other hand, if it is determined at block 502 that the MCS is excluded from the set of allowed MCSs for the transmission configuration being utilized (i.e., that the MCS is not allowed by the communication protocol), then a second PHY data unit is generated using an excluded MCS. In an embodiment, generating the second PHY data unit includes blocks 508 and 510.

At block 508, a number of OFDM symbols to be included in a payload of the second PHY data unit is calculated according to a second technique, different from the first technique defined by the communication protocol. In one embodiment, the number of OFDM symbols is determined at block 508 according to Equation 2. In this embodiment, the rest of the encoding flow defined by the communication protocol is not changed when the second data unit is generated. In this case, a device receiving the data unit generated at block 508 decodes the received data unit using a technique consistent with the communication protocol. In another embodiment, the number of OFDM symbols is determined at block 508 using a virtual number of data bits per symbol (e.g., according to Equations 3, 4, 5 or according to Equations 3, 4, 6). In yet another embodiment, the number of OFDM symbols is determined at block 508 using a virtual number of coded bits per symbol, wherein the virtual number of coded bits per symbols is selected such that the number of data bits per symbol is an integer. In such embodiments, the rest of the encoding flow defined by the communication protocol (e.g., padding, shortening, puncturing, repletion, bit calculation, etc.) is slightly changed from the encoding flow defined by the communication protocol.

At block 510, the number of OFDM symbols determined at block 508 is generated for inclusion in the payload of the second PHY data unit.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed:

1. A method for generating physical layer (PHY) data units for transmission via a communication channel, the method comprising:
generating a plurality of first PHY data units that conform to a communication protocol and that are to be transmitted in accordance with a transmission configuration, wherein the transmission configuration corresponds to at least one of (i) one or more particular numbers of spatial streams, and (ii) one or more particular channel bandwidths, wherein the communication protocol specifies
(i) a set of allowed modulation and coding schemes (MCSs) for the transmission configuration, and
(ii) a first technique for determining, for each first PHY data unit, a number of orthogonal frequency division multiplexing (OFDM) symbols to be included in a payload of the first PHY data unit; and
generating a second PHY data unit for transmission according to the transmission configuration, including
determining, according to a second technique, a number of OFDM symbols to be included in a payload of the second PHY data unit, wherein the second PHY data unit is to be transmitted using an MCS excluded from the set of allowed MCSs, and
generating the determined number of OFDM symbols to be included in the payload of the second PHY data unit.

2. A method according to claim 1, wherein determining, according to the second technique, the number of OFDM symbols to be included in the payload of the second PHY data unit comprises calculating an estimated number of OFDM symbols to be included in the payload of the second PHY data unit according to:

$$N_{sym,init} = m_{STBC} * \left\lceil \frac{(8L+16)}{m_{STBC}\lfloor N_{DBPS} \rfloor} \right\rceil,$$

wherein
L is a number of octets of information bits to be included in the payload of the second PHY data unit, $m_{STBC}$ is a parameter indication whether space-time block coding is utilized, wherein $m_{STBC}=2$ if space-time block coding is utilized and $m_{STBC}=1$ if space-time block coding is not utilized, and $N_{DBPS}$ is a number of data bits per OFDM symbol.

3. A method according to claim 2, wherein generating the second PHY data unit comprises determining a number of information bits to be included in the payload of the second PHY data unit according to:

$$N_{pld}=N_{sym,init} \times \lfloor N_{DBPS} \rfloor.$$

4. A method according to claim 3, wherein generating the second PHY data unit comprises:
    determining a number of available bits within a minimum number of OFDM symbols required for a data field of the second PHY data unit according to:

$$N_{avbits}=N_{CBPS} \times N_{sym,init}; \text{ and}$$

determining at least one of (i) a number of shortening bits, (ii) a number of puncturing bits, or (iii) a number of repetition bits based on $N_{avbits}$.

5. A method according to claim 1, wherein generating the plurality of first PHY data units comprises, for each of the first PHY data units,
    determining, according to the second technique, the number of OFDM symbols to be included in the payload of the first PHY data unit when using an MCS included in the set of allowed MCSs, and
    generating the determined number of OFDM symbols to be included in the payload of the first PHY data unit.

6. A method according to claim 1, wherein determining, according to the second technique, the number of OFDM symbols to be included in the payload of the second PHY data unit comprises calculating the number of OFDM symbols to be included in the payload of the second PHY data unit according to:

$$N_{sym,init} = i * m_{STBC} * \left\lceil \frac{(8L+16)}{i*(m_{STBC}N_{DBPS})} \right\rceil,$$

wherein
    L is a number of octets in a plurality of information bits to be included in the payload of the second PHY data unit,
    $m_{STBC}$ is a parameter indication whether space-time block coding is utilized, wherein $m_{STBC}=2$ if space-time block coding is utilized and $m_{STBC}=1$ if space-time block coding is not utilized,
    $N_{DBPS}$ is a number of data bits per OFDM symbol, and
    i is an integer selected such that $i*(m_{STBC}N_{DBPS})$ is an integer.

7. A method according to claim 1, wherein determining, according to the second technique, the number of OFDM symbols to be included in the payload of the second PHY data unit comprises calculating an estimated number of OFDM symbols to be included in the payload of the second PHY data unit according to:

$$N_{sym,init} = m_{STBC} \times \left\lceil \frac{8L+16}{m_{STBC} \times N_{CBPS}^{virtual} \times R} \right\rceil,$$

wherein
    L is a number of octets in information bits to be included in the payload of the second PHY data unit, $m_{STBC}$ is a parameter indication whether space-time block coding is utilized, wherein $m_{STBC}=2$ if space-time block coding is utilized and $m_{STBC}=1$ if space-time block coding is not utilized, $N_{CBPS}^{virtual}$ is an integer less than $N_{CBPS}$, wherein $N_{CBPS}$ is a number of data bits per OFDM symbol, and R is a coding rate.

8. A method according to claim 7, wherein generating the determined number the number of OFDM symbols to be included in the payload of the second PHY data unit comprises adding one or more padding bits after encoding with an LDPC encoder such that each OFDM symbol includes $N_{CBPS}$ bits.

9. An apparatus for generating physical layer (PHY) data units for transmission via a communication channel, the apparatus comprising:
    a network interface configured to
        generate a plurality of first PHY data units that conform to a communication protocol and that are to be transmitted in accordance with a transmission configuration, wherein the transmission configuration corresponds to at least one of (i) one or more particular numbers of spatial streams, and (ii) one or more particular channel bandwidths, and wherein the communication protocol specifies
            (i) a set of allowed modulation and coding schemes (MCSs) for the transmission configuration, and
            (ii) a first technique for determining, for each first PHY data unit, a number of orthogonal frequency division multiplexing (OFDM) symbols to be included in a payload of the first PHY data unit; and
        generate a second PHY data unit for transmission according to the transmission configuration, wherein the network interface is configured to, when generating the second PHY data unit
        determine, according to a second technique, a number of OFDM symbols to be included in a payload of the second PHY data unit, wherein the second PHY data unit is to be transmitted using an MCS excluded from the set of allowed MCSs, and
        generate the determined number of OFDM symbols to be included in the payload of the second PHY data unit.

10. An apparatus according to claim 9, wherein the network interface is configured to determine, according to the second technique, the number of OFDM symbols to be included in the payload of the second PHY data unit by calculating an estimated number of OFDM symbols to be included in the payload of the second PHY data unit according to:

$$N_{sym,init} = m_{STBC} * \left\lceil \frac{(8L+16)}{m_{STBC} \lfloor N_{DBPS} \rfloor)} \right\rceil,$$

wherein
    L is a number of octets of information bits to be included in the payload of the second PHY data unit,
    $m_{STBC}$ is a parameter indication whether space-time block coding is utilized, wherein $m_{STBC}=2$ if space-time block coding is utilized and $m_{STBC}=1$ if space-time block coding is not utilized, and
    $N_{DBPS}$ is a number of data bits per OFDM symbol.

11. An apparatus according to claim 10, wherein the network interface is configured to generate the second PHY data unit by determining a number of information bits to be included in the payload of the second PHY data unit according to:

$$N_{pld}=N_{sym,init} \times \lfloor N_{DBPS} \rfloor.$$

12. An apparatus according to claim 11, wherein the network interface is configured to generate the second PHY data unit by:
   determining a number of available bits within a minimum number of OFDM symbols required for a data field of the second PHY data unit according to:

$$N_{avbits}=N_{CBPS} \times N_{sym,init}; \text{ and}$$

determining at least one of (i) a number of shortening bits, (ii) a number of puncturing bits, or (iii) a number of repetition bits based on $N_{avbits}$.

13. An apparatus according to claim 9, wherein the network interface is configured to, when generating the plurality of first PHY data units, for each of the first PHY data units:
   determine, according to the second technique, the number of OFDM symbols to be included in the payload of the first PHY data unit when using an MCS included in the set of allowed MCSs, and
   generate the determined number of OFDM symbols to be included in the payload of the first PHY data unit.

14. An apparatus according to claim 9, wherein the network interface is configured to determine, according to the second technique, the number of OFDM symbols to be included in the payload of the second PHY data unit by calculating an estimated number of OFDM symbols to be included in the payload of the second PHY data unit according to:

$$N_{sym,init} = i * m_{STBC} * \left\lceil \frac{(8L+16)}{i*(m_{STBC}N_{DBPS})} \right\rceil,$$

wherein
L is a number of octets in information bits to be included in the payload of the second PHY data unit,
$m_{STBC}$ is a parameter indication whether space-time block coding is utilized, wherein $m_{STBC}=2$ if space-time block coding is utilized and $m_{STBC}=1$ if space-time block coding is not utilized,
$N_{DBPS}$ is a number of data bits per OFDM symbol, and
i is an integer selected such that $i*(m_{STBC}N_{DBPS})$ is an integer.

15. An apparatus according to claim 14, wherein the communication channel is a 20 MHz-wide communication channel and wherein i=3.

16. An apparatus according to claim 9, wherein the network interface is configured to determine, according to the second technique, the number of OFDM symbols to be included in the payload of the second PHY data unit according by calculating an estimated number of OFDM symbols to be included in the second PHY data unit according to:

$$N_{sym,init} = m_{STBC} \times \left\lceil \frac{8L+16}{m_{STBC} \times N_{CBPS}^{virtual} \times R} \right\rceil,$$

wherein
L is a number of octets in information bits to be included in the payload of the second PHY data unit, $m_{STBC}$ is a parameter indication whether space-time block coding is utilized, wherein $m_{STBC}=2$ if space-time block coding is utilized and $m_{STBC}=1$ if space-time block coding is not utilized,
$N_{CBPS}^{virtual}$ is an integer less than $N_{CBPS}$, wherein $N_{CBPS}$ is a number of data bits per OFDM symbol, and
R is a coding rate.

17. An apparatus according to claim 16, wherein the network apparatus is further configured to add one or more padding bits after encoding with an LDPC encoder such that each OFDM symbol includes $N_{CBPS}$ bits.

18. A method for generating a PHY data unit for transmission in a communication channel, wherein the PHY data unit is to be transmitted in accordance with a transmission configuration, wherein the transmission configuration corresponds to at least one of (i) one or more particular numbers of spatial streams and (ii) one or more particular channel bandwidths, the method comprising:
   determining a number of orthogonal frequency division multiplexing (OFDM) symbols to be included in a payload of the PHY data unit, including (i) determining the number of OFDM symbols according to a first technique when using a modulation and coding scheme (MCS) from a set of MCSs allowed for the transmission configuration and (ii) determining the number of OFDM symbols according to a second technique when using an MCS excluded from the set of MCSs allowed for the transmission configuration; and
   generating the PHY data unit to include the determined number of OFDM symbols.

19. A method according to claim 18, wherein determining the number of OFDM symbols according to the second technique comprises calculating an estimated number of OFDM symbols to be included in the payload of the second PHY data unit according to:

$$N_{sym,init} = m_{STBC} * \left\lceil \frac{(8L+16)}{m_{STBC} \lfloor N_{DBPS} \rfloor} \right\rceil,$$

wherein
L is a number of octets of information bits to be included in the payload of the second PHY data unit,
$m_{STBC}$ is a parameter indication whether space-time block coding is utilized, wherein $m_{STBC}=2$ if space-time block coding is utilized and $m_{STBC}=1$ if space-time block coding is not utilized, and
$N_{DBPS}$ is a number of data bits per OFDM symbol.

20. A method according to claim 19, wherein generating the PHY data unit when using an MCS excluded from the set of MCSs allowed for the transmission configuration comprises determining a number of information bits to be included in the payload of the PHY data unit according to:

$$N_{pld}=N_{sym,init} \times \lfloor N_{DBPS} \rfloor.$$

21. A method according to claim 20, wherein generating the PHY data unit when using an MCS excluded from the set of MCSs allowed for the transmission configuration comprises:
   determining a number of available bits within a minimum number of OFDM symbols required for a data field of the second PHY data unit according to:

$$N_{avbits}=N_{CBPS} \times N_{sym,init}; \text{ and}$$

determining at least one of (i) a number of shortening bits, (ii) a number of puncturing bits, or (iii) a number of repetition bits based on $N_{avbits}$.

22. A method according to claim 18, wherein determining the number of OFDM symbols according to the second technique comprises calculating an estimated number of OFDM symbols according to:

$$N_{sym,init} = i * m_{STBC} * \left\lceil \frac{(8L+16)}{i*(m_{STBC}N_{DBPS})} \right\rceil,$$

wherein

L is a number of octets in information bits to be included in the payload of the PHY data unit, $m_{STBC}$ is a parameter indication whether space-time block coding is utilized, wherein $m_{STBC}=2$ if space-time block coding is utilized and $m_{STBC}=1$ if space-time block coding is not utilized, $N_{DBPS}$ is a number of data bits per OFDM symbol, and i is an integer selected such that $i*(m_{STBC}N_{DBPS})$ is an integer.

23. A method according to claim 18, wherein determining the number of OFDM symbols according to the second technique comprises calculating an estimated number of OFDM symbols according to:

$$N_{sym,init} = m_{STBC} \times \left\lceil \frac{8L+16}{m_{STBC} \times N_{CBPS}^{virtual} \times R} \right\rceil,$$

wherein

L is a number of octets in information bits to be included in the payload of the PHY data unit, $m_{STBC}$ is a parameter indication whether space-time block coding is utilized, wherein $m_{STBC}=2$ if space-time block coding is utilized and $m_{STBC}=1$ if space-time block coding is not utilized, $N_{CBPS}^{virtual}$ is an integer less than $N_{CBPS}$, wherein $N_{CBPS}$ is a number of encoded data bits per OFDM symbol, and R is a coding rate.

24. A method according to claim 23, wherein generating the PHY data unit comprises adding one or more padding bits, after encoding with an LDPC encoder, such that each OFDM symbol includes $N_{CBPS}$ bits.

25. An apparatus for generating a PHY data unit for transmission in a communication channel, wherein the PHY data unit is to be transmitted in accordance with a transmission configuration, wherein the transmission configuration corresponds to at least one of (i) one or more particular numbers of spatial streams and (ii) one or more particular channel bandwidths, the apparatus comprising:
  a network interface configured to
    determine a number of orthogonal frequency division multiplexing (OFDM) symbols to be included in a payload of the PHY data unit, including (i) determining the number of OFDM symbols according to a first technique when using a modulation and coding scheme (MCS) from a set of MCSs allowed for the transmission configuration and (ii) determining the number of OFDM symbols according to a second technique when using an MCS excluded from the set of MCSs allowed for the transmission configuration, and
    generate the PHY data unit to include the determined number of OFDM symbols.

26. An apparatus according to claim 25, wherein the network interface is configured to determine the number of OFDM symbols according to the second technique by calculating an estimated number of OFDM symbols to be included in the payload of the second PHY data unit according to:

$$N_{sym,init} = m_{STBC} * \left\lceil \frac{(8L+16)}{m_{STBC} \lfloor N_{DBPS} \rfloor} \right\rceil,$$

wherein

L is a number of octets of information bits to be included in the payload of the second PHY data unit, $m_{STBC}$ is a parameter indication whether space-time block coding is utilized, wherein $m_{STBC}=2$ if space-time block coding is utilized and $m_{STBC}=1$ if space-time block coding is not utilized, and $N_{DBPS}$ is a number of data bits per OFDM symbol.

27. An apparatus according to claim 26, wherein the network interface is configured to generate the PHY data unit, when using an MCS excluded from the set of MCSs allowed for the transmission configuration, by determining a number of information bits to be included in the payload of the PHY data unit according to:

$$N_{pld} = N_{sym,init} \times \lfloor N_{DBPS} \rfloor.$$

28. An apparatus according to claim 27, wherein the network interface is configured to generate the PHY data unit, when using an MCS excluded from the set of MCSs allowed for the transmission configuration, by:
  determining a number of available bits within a minimum number of OFDM symbols required for a data field of the second PHY data unit according to:

$$N_{avbits} = N_{CBPS} \times N_{sym,init}; \text{ and}$$

determining at least one of (i) a number of shortening bits, (ii) a number of puncturing bits, or (iii) a number of repetition bits based on $N_{avbits}$.

29. An apparatus according to claim 25, wherein the network interface is configured to determine the number of OFDM symbols according to the second technique by calculating an estimated number of OFDM symbols according to:

$$N_{sym,init} = i * m_{STBC} * \left\lceil \frac{(8L+16)}{i*(m_{STBC}N_{DBPS})} \right\rceil,$$

wherein

L is a number of octets in information bits to be included in the payload of the PHY data unit, $m_{STBC}$ is a parameter indication whether space-time block coding is utilized, wherein $m_{STBC}=2$ if space-time block coding is utilized and $m_{STBC}=1$ if space-time block coding is not utilized, $N_{DBPS}$ is a number of data bits per OFDM symbol, i is an integer selected such that $i*(m_{STBC}N_{DBPS})$ is an integer.

30. An apparatus according to claim 25, wherein determining the number of OFDM symbols according to the second technique comprises calculating an estimated number of OFDM symbols according to:

$$N_{sym,init} = m_{STBC} \times \left\lceil \frac{8L+16}{m_{STBC} \times N_{CBPS}^{virtual} \times R} \right\rceil,$$

wherein

L is a number of octets in information bits to be included in the payload of the PHY data unit, $m_{STBC}$ is a parameter indication whether space-time block coding is utilized, wherein $m_{STBC}=2$ if space-time block coding is utilized and $m_{STBC}=1$ if space-time block coding is not utilized, $N_{CBPS}^{virtual}$ is an integer less than $N_{CBPS}$, wherein $N_{CBPS}$ is a number of encoded data bits per OFDM symbol, and R is a coding rate.

31. An apparatus according to claim 30, wherein generating the number the number of OFDM symbols comprises adding one or more padding bits, after encoding with an LDPC encoder, such that each OFDM symbol includes $N_{CBPS}$ bits.

\* \* \* \* \*